(12) United States Patent
Jin et al.

(10) Patent No.: US 11,996,959 B2
(45) Date of Patent: May 28, 2024

(54) SRS TRANSMISSION METHOD, ACCESS NETWORK DEVICE, AND TERMINAL DEVICE

(71) Applicant: HUAWEI TECHNOLOGIES CO., LTD., Guangdong (CN)

(72) Inventors: Tao Jin, Shanghai (CN); Wei Chen, Shanghai (CN); Xiaojun Zheng, Shanghai (CN); Chunlin Xue, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 490 days.

(21) Appl. No.: 17/338,746

(22) Filed: Jun. 4, 2021

(65) Prior Publication Data

US 2021/0297291 A1 Sep. 23, 2021

Related U.S. Application Data

(63) Continuation of application No. PCT/CN2019/123287, filed on Dec. 5, 2019.

(30) Foreign Application Priority Data

Dec. 6, 2018 (CN) .......................... 201811489279.9

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0051* (2013.01); *H04W 72/0446* (2013.01); *H04W 72/0453* (2013.01); *H04W 72/1268* (2013.01)

(58) Field of Classification Search
CPC ............ H04L 25/0226; H04L 5/0051; H04W 72/0446; H04W 72/0453; H04W 72/1268
See application file for complete search history.

(56) References Cited

U.S. PATENT DOCUMENTS 8,849,292 B2 * 9/2014 Tiirola .................. H04L 5/0048
455/450
2015/0131589 A1 * 5/2015 Dinan ................... H04L 1/1812
370/329
(Continued)

FOREIGN PATENT DOCUMENTS

CA 3040859 A1 11/2018
CN 106612556 A 5/2017
(Continued)

OTHER PUBLICATIONS

Huawei Hisilicon Huawei Technologies Co Ltd: "Motivation for new WI proposal on SRS enhancements for L TE", 3GPP Draft; RP-170346,Mar. 18, 2018, XP051507023, total 6 pages.

(Continued)

*Primary Examiner* — Ajay Cattungal

(57) ABSTRACT

The technology described herein relates to an SRS transmission method, an access network device, and a terminal device. The method includes sending channel sounding reference signal (SRS) time domain resource indication information to a terminal device, where the SRS time domain resource indication information indicates an SRS time domain resource, and the SRS time domain resource includes at least one of a first symbol to an eighth symbol in a first slot. The method further includes receiving an SRS from the terminal device on the SRS time domain resource.

20 Claims, 10 Drawing Sheets

(51) Int. Cl.
*H04W 72/0446* (2023.01)
*H04W 72/0453* (2023.01)
*H04W 72/1268* (2023.01)

(56) References Cited

U.S. PATENT DOCUMENTS

| | | | |
|---|---|---|---|
| 2020/0028642 A1* | 1/2020 | He | H04L 5/0048 |
| 2020/0099490 A1* | 3/2020 | Sridharan | H04B 7/0671 |
| 2020/0106646 A1* | 4/2020 | Liu | H04L 25/0226 |
| 2020/0396046 A1* | 12/2020 | Kwon | H04B 7/0632 |

FOREIGN PATENT DOCUMENTS

| | | |
|---|---|---|
| CN | 107135053 A | 9/2017 |
| CN | 107347004 A | 11/2017 |
| EP | 3373494 A1 | 9/2018 |
| WO | 2018199696 A1 | 11/2018 |

OTHER PUBLICATIONS

NTT Docomo: "SRS Enhancement for Elevation BF and FD-MIMO", 3GPP Draft; R1-154663, Aug. 23, 2015, XP051039542, total 3 pages.
Extended European Search Report for EP Application No. 19893111.5 dated Nov. 12, 2021 (11 pages).
Catt, Further discussion on remaining issues on SRS. 3GPP TSG RAN WG1 Meeting 90bis, Prague, CZ, Oct. 9-13, 2017, R1-1717820, 4 pages.
Catt, Remaining issues on SRS. 3GPP TSG RAN WG1 Meeting NR#3, Nagoya, Japan, Sep. 18-21, 2017, R1-1715809, 4 pages.
International Search Report and Written Opinion issued in PCT/CN2019/123287 dated Mar. 6, 2020, 9 pages.
Ericsson, Remaining details on SRS design. 3GPP TSG RAN WG1 Meeting 91, Reno, USA, Nov. 27-Dec. 1, 2017, R1-1720744, 9 pages.
Office Action for Chinese Application No. 201811489279.9 dated Dec. 22, 2021, 16 pages.

* cited by examiner

SRS TRANSMISSION METHOD, ACCESS NETWORK DEVICE, AND TERMINAL DEVICE

CROSS-REFERENCE TO RELATED APPLICATIONS

This application is a continuation of International Application No. PCT/CN2019/123287, filed on Dec. 5, 2019, which claims priority to Chinese Patent Application No. 201811489279.9, filed on Dec. 6, 2018. The disclosures of the aforementioned applications are hereby incorporated by reference in their entireties.

TECHNICAL FIELD

This application relates to the field of communications technologies, and more specifically, to an SRS transmission method, an access network device, and a terminal device.

BACKGROUND

In a process in which an access network device communicates with a terminal device, the terminal device may send uplink data to the access network device through a physical uplink shared channel (PUSCH). In addition, to determine a channel status, the terminal device may further send a channel sounding reference signal (SRS) to the access network device. After receiving the SRS sent by the terminal device, the access network device may perform channel estimation based on the received SRS.

As network load increases and mobile users have a higher requirement on a network transmission rate, to ensure uplink PUSCH transmission, an SRS transmission periodicity may be prolonged, affecting the channel estimation. How to ensure SRS transmission performance is a problem that needs to be resolved.

SUMMARY

This application provides an SRS transmission method, an access network device, and a terminal device, to allocate more symbols to transmit an SRS, so that more accurate channel estimation can be performed based on the SRS.

According to a first aspect, an SRS transmission method is provided. The method includes: sending channel sounding reference signal SRS time domain resource indication information to a terminal device, where the SRS time domain resource indication information indicates an SRS time domain resource, and the SRS time domain resource includes at least one of the first symbol to the eighth symbol in a first slot; and receiving an SRS from the terminal device on the SRS time domain resource.

Optionally, the first slot is an uplink slot or a special slot.

The uplink slot may be a slot including only uplink symbols, and the special slot may be a slot including uplink symbols and downlink symbols.

The method may be performed by an access network device or a chip in an access network device.

When the method is performed by the access network device, the terminal device may be a device located in a network coverage area of the access network device.

In this application, the SRS may be transmitted by using at least one of the first symbol to the eighth symbol in the first slot. Compared with a manner, in a conventional solution, in which an SRS can be transmitted by using at most four of the last six symbols in a slot, the manner in this application may allocate more symbols to transmit the SRS, so that the access network device can perform more accurate channel estimation based on the received SRS, thereby improving a downlink throughput.

A quantity of symbols in the first slot may be 14, and a part or all of symbols in the first slot may be used to transmit the SRS.

When all of the symbols in the first slot are used to transmit the SRS, more time domain resources can be used to transmit the SRS, so that an SRS capacity can be increased, thereby improving accuracy of the channel estimation performed based on the SRS.

With reference to the first aspect, in some implementations of the first aspect, the SRS time domain resource further includes M symbols of the ninth symbol to the fourteenth symbol in the first slot, and M is a positive integer.

In this application, the SRS can be transmitted by using any quantity of symbols of the last six symbols in the first slot. Compared with a manner, in the conventional solution, in which an SRS can be transmitted by using only a fixed quantity of symbols of the last six symbols (usually using one, two, or four of the six symbols) in a slot, the manner in this application can more flexibly allocate symbols used to transmit the SRS.

With reference to the first aspect, in some implementations of the first aspect, M=3, M=5, or M=6.

In this application, the SRS may be transmitted by using any quantity of symbols of the first eight symbols in the first slot and any quantity of symbols of the last six symbols in the first slot. Compared with the manner, in the conventional solution, in which an SRS can be transmitted by using only a fixed quantity (for example, three, five, or six) of symbols of the last six symbols in a slot, the manner in this application can more flexibly allocate symbols used to transmit the SRS, and can use more symbols to transmit the SRS, so that the access network device can perform more accurate channel estimation based on the received SRS, thereby improving the downlink throughput.

With reference to the first aspect, in some implementations of the first aspect, the symbols in the SRS time domain resource are consecutive.

With reference to the first aspect, in some implementations of the first aspect, the symbols in the SRS time domain resource are inconsecutive.

In this application, the SRS may be transmitted by using consecutive symbols, or may be transmitted by using inconsecutive symbols. Compared with a manner, in the conventional solution, in which an SRS can be transmitted by using only consecutive symbols, the manner of transmitting the SRS in this application is more flexible.

According to a second aspect, an SRS transmission method is provided. The method includes: sending channel sounding reference signal SRS time domain resource indication information to a terminal device, where the SRS time domain resource indication information indicates an SRS time domain resource, and the SRS time domain resource includes three symbols, five symbols, or six symbols of the ninth symbol to the fourteenth symbol in a first slot; and receiving an SRS from the terminal device on the SRS time domain resource.

The method may be performed by an access network device or a chip in an access network device.

Optionally, the first slot is an uplink slot or a special slot.

In this application, the access network device may receive, on three, five, or six of the last six symbols in the first slot, the SRS sent by the terminal device. Compared with a manner, in a conventional solution, in which an SRS can be transmitted by using at most four of the last six symbols in a slot (e.g., in this application, at most all of the last six symbols in a slot can be allocated to transmit the SRS, however, in the conventional solution, at most four of the last six symbols in a slot can be allocated), the manner in this application may allocate more symbols to transmit the SRS, so that the access network device can perform more accurate channel estimation based on the received SRS, thereby improving a downlink throughput.

With reference to the second aspect, in some implementations of the second aspect, the symbols in the SRS time domain resource are consecutive.

With reference to the second aspect, in some implementations of the second aspect, when the SRS time domain resource includes three symbols or five symbols of the ninth symbol to the fourteenth symbol in the first slot, the symbols in the SRS time domain resource are inconsecutive.

In this application, the SRS may be transmitted by using a plurality of consecutive symbols of the last six symbols in a slot, or may be transmitted by using a plurality of inconsecutive symbols of the last six symbols in a slot. Compared with a manner, in the conventional solution, in which an SRS can be transmitted by using only consecutive symbols, the manner of transmitting the SRS in this application is more flexible.

According to a third aspect, an SRS transmission method is provided. The method includes: receiving channel sounding reference signal SRS time domain resource indication information from an access network device, where the SRS time domain resource indication information indicates an SRS time domain resource, and the SRS time domain resource includes at least one of the first symbol to the eighth symbol in a first slot; and sending an SRS to the access network device on the SRS time domain resource.

The method may be performed by a terminal device or a chip in a terminal device.

When the method is performed by the terminal device, the terminal device may be a device in a network coverage area of the access network device.

In this application, because the SRS may also be transmitted by using at least one of the first symbol to the eighth symbol in the first slot, compared with a manner, in a conventional solution, in which an SRS can be transmitted by using at most four of the last six symbols in a slot, the manner in this application may allocate more symbols to transmit the SRS, so that the access network device can perform more accurate channel estimation based on the received SRS, thereby improving a downlink throughput.

With reference to the third aspect, in some implementations of the third aspect, the SRS time domain resource further includes M symbols of the ninth symbol to the fourteenth symbol in the first slot, and M is a positive integer.

When all of symbols in the first slot are used to transmit the SRS, more time domain resources can be allocated to transmit the SRS, so that an SRS capacity can be increased, thereby improving accuracy of the channel estimation performed based on the SRS.

With reference to the third aspect, in some implementations of the third aspect, M=3, M=5, or M=6.

In this application, the SRS may be transmitted by using any quantity of symbols of the first eight symbols in the first slot and any quantity of symbols of the last six symbols in the first slot. Compared with a manner, in the conventional solution, in which an SRS can be transmitted by using only one, two, or four of the last six symbols in a slot, the manner in this application can more flexibly allocate symbols used to transmit the SRS, and can use more symbols to transmit the SRS, so that the access network device can perform more accurate channel estimation based on the received SRS, thereby improving the downlink throughput.

With reference to the third aspect, in some implementations of the third aspect, the symbols in the SRS time domain resource are consecutive.

With reference to the third aspect, in some implementations of the third aspect, the symbols in the SRS time domain resource are inconsecutive.

In this application, the SRS may be transmitted by using consecutive symbols, or may be transmitted by using inconsecutive symbols. Compared with a manner, in the conventional solution, in which an SRS can be transmitted by using only consecutive symbols, the manner of transmitting the SRS in this application is more flexible.

According to a fourth aspect, an SRS transmission method is provided. The method includes: receiving channel sounding reference signal SRS time domain resource indication information from an access network device, where the SRS time domain resource indication information indicates an SRS time domain resource, and the SRS time domain resource includes three symbols, five symbols, or six symbols of the ninth symbol to the fourteenth symbol in a first slot; and sending an SRS to the access network device on the SRS time domain resource.

The method may be performed by a terminal device or a chip in a terminal device.

When the method is performed by the terminal device, the terminal device may be a device in a network coverage area of the access network device.

In this application, the SRS may be transmitted by using any quantity of symbols of the first eight symbols in the first slot and any quantity of symbols of the last six symbols in the first slot. Compared with a manner, in a conventional solution, in which an SRS can be transmitted by using only one, two, or four of the last six symbols in a slot, the manner in this application can more flexibly allocate symbols used to transmit the SRS, and can use more symbols to transmit the SRS, so that the access network device can perform more accurate channel estimation based on the received SRS, thereby improving a downlink throughput.

With reference to the fourth aspect, in some implementations of the fourth aspect, the symbols in the SRS time domain resource are consecutive.

With reference to the fourth aspect, in some implementations of the fourth aspect, when the SRS time domain resource includes three symbols or five symbols of the ninth symbol to the fourteenth symbol in the first slot, the symbols in the SRS time domain resource are inconsecutive.

In this application, the SRS may be transmitted by using a plurality of consecutive symbols of the last six symbols in a slot, or may be transmitted by using a plurality of inconsecutive symbols of the last six symbols in a slot. Compared with a manner, in the conventional solution, in which an SRS can be transmitted by using only consecutive symbols, the manner of transmitting the SRS in this application is more flexible.

According to a fifth aspect, an access network device is provided. The access network device includes units or modules configured to perform the implementations in the first aspect or the second aspect.

According to a sixth aspect, a terminal device is provided. The access network device includes units or modules configured to perform the implementations in the third aspect or the fourth aspect.

According to a seventh aspect, an access network device is provided, and includes a memory and a processor. The processor invokes program code stored in the memory to execute a part or all of steps of any method in the first aspect.

Optionally, the memory is a nonvolatile memory.

Optionally, the memory and the processor are coupled together.

According to an eighth aspect, a terminal device is provided, and includes a memory and a processor. The processor invokes program code stored in the memory to execute a part or all of steps of any method in the first aspect.

Optionally, the memory is a nonvolatile memory.

Optionally, the memory and the processor are coupled together.

According to a ninth aspect, a communications apparatus is provided. The communications apparatus includes a processor, the processor is coupled to a memory, the memory is configured to store computer programs or instructions, and the processor is configured to execute the computer programs or the instructions in the memory, to enable the communications apparatus to perform the method in the implementations of any one of the first aspect, the second aspect, the third aspect, and the fourth aspect.

According to a tenth aspect, an embodiment of this application provides a communications apparatus. The communications apparatus may be a chip in an access network device, the communications apparatus includes a processor, the processor is coupled to a memory, the memory is configured to store computer programs or instructions, and the processor is configured to execute the computer programs or the instructions in the memory, to enable the communications apparatus to perform the method in any implementation of the first aspect or the second aspect. Optionally, the communications apparatus further includes the memory.

According to an eleventh aspect, an embodiment of this application provides a communications apparatus. The communications apparatus may be a chip in a terminal device, the communications apparatus includes a processor, the processor is coupled to a memory, the memory is configured to store computer programs or instructions, and the processor is configured to execute the computer programs or the instructions in the memory, to enable the communications apparatus to perform the method in any implementation of the third aspect or the fourth aspect. Optionally, the communications apparatus further includes the memory.

According to a twelfth aspect, a computer-readable storage medium is provided. The computer-readable storage medium stores program code, and the program code includes instructions used to perform a part or all of steps of any method in the first aspect or the second aspect.

According to a thirteenth aspect, an embodiment of this application provides a computer program product. When the computer program product runs on a computer, the computer is enabled to perform a part or all of steps of any method in the first aspect or the second aspect.

DESCRIPTION OF EMBODIMENTS

The following describes technical solutions in this application with reference to the accompanying drawings.

Figure 1:
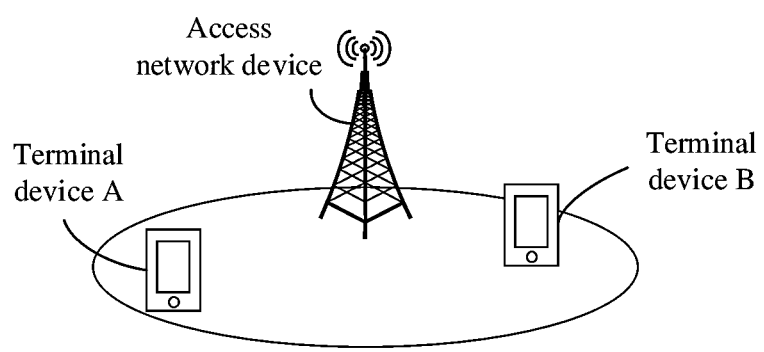
FIG. 1 is an example schematic diagram of a possible application scenario according to an embodiment of this application.

FIG. 1 is a schematic diagram of a possible application scenario according to an embodiment of this application. A communications system shown in FIG. 1 includes an access network device, a terminal device A, and a terminal device B. Both the terminal device A and the terminal device B are in a network coverage area of the access network device. The terminal device A may communicate with the access network device, and the terminal device B may communicate with the access network device. To estimate a channel status, the terminal device A and the terminal device B each may send an SRS to the access network device. After receiving the SRS, the access network device may perform channel estimation based on the SRS.

It should be understood that FIG. 1 shows only the communications system including two terminal devices and one network device. Certain embodiments of this application may be further used in a communications system including any quantity of terminal devices and any quantity of access network devices.

The embodiments of this application may be used in a wireless multi-frequency multi-radio access technology (RAT) system.

Specifically, systems in which the embodiments of this application may be used include but are not limited to a time division duplex (TDD) system, a frequency division duplex (FDD) system, a long term evolution (LTE) system, and a new radio (NR) system.

In addition, this application may be further used in a plurality of networking scenarios. For example, the networking scenarios in which the embodiments of this application may be used include but are not limited to uplink and downlink decoupling, carrier aggregation (CA), and dual connectivity (DC) networking scenarios.

The embodiments of this application may be further used in a plurality of transmit/receive forms. For example, the transmit/receive forms in which the embodiments of this application may be used include but are not limited to 2 transmit 2 receive (2T2R), 2 transmit 4 receive (2T4R), 4 transmit 4 receive (4T4R), 8 transmit 8 receive (8T8R), and massive multiple-input multiple-output (MIMO).

Figure 2:
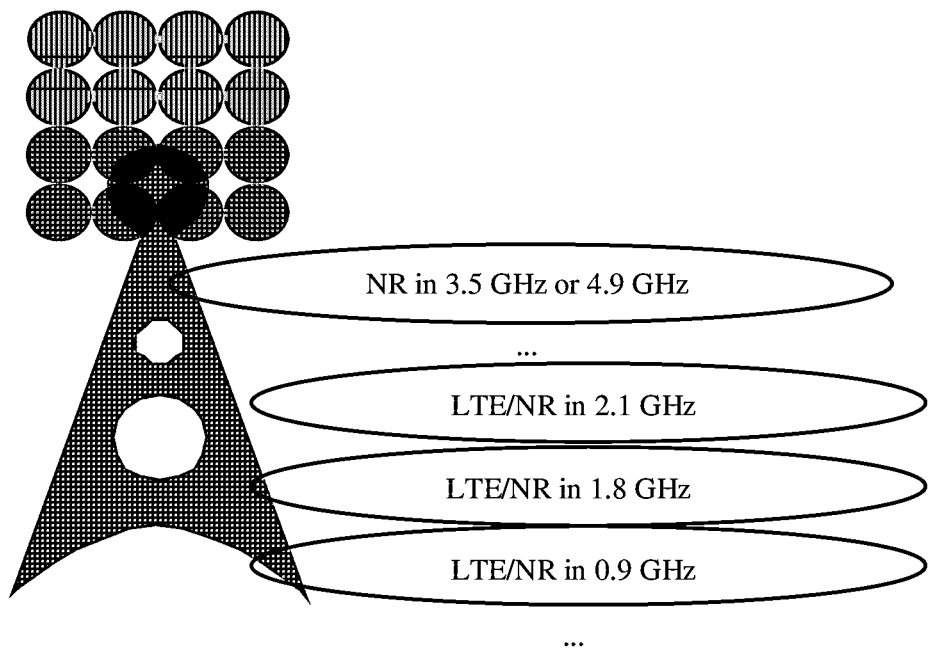
FIG. 2 is an example schematic diagram of a possible application scenario according to an embodiment of this application.

The embodiments of this application may further be specifically used in communications systems in some frequency bands. For example, as shown in FIG. 2, the embodiments of this application may be used in an NR system in a frequency band of 3.5 GHz or 4.9 GHz, or may be used in LTE or NR communications systems in frequency bands of 0.9 GHz, 1.8 GHz, and 2.1 GHz.

The terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

The access network device in the embodiments of this application may be a device configured to communicate with the terminal device. The access network device may alternatively be an evolved NodeB (evolved NodeB, eNB, or eNodeB) in an LTE system, or may be a radio controller in a cloud radio access network (CRAN) scenario. Alternatively, the access network device may be a relay station, an access point, a vehicle-mounted device, a wearable device, an access network device in the future 5G network, an access network device in the future evolved PLMN network, or the like. This is not limited in the embodiments of this application.

In the embodiments of this application, the terminal device or the access network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems, for example, a Linux® operating system, a Unix® operating system, an Android® operating system, an iOS® operating system, or a Windows® operating system, that implement service processing by using a process. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device, the access network device, or a function module that can invoke and execute the program and that is in the terminal device or the access network device.

Because both PUSCH transmission and SRS transmission need to occupy time domain resources, to ensure the PUSCH transmission, time domain resources allocated to an SRS in a related solution are very limited. For example, the SRS may be transmitted by using one symbol, two consecutive symbols, or four consecutive symbols of the last six symbols in a slot.

As network load increases and a network transmission rate needs to be increased, to ensure a channel estimation result, the terminal device needs to transmit more SRSs to the access network device. Therefore, to ensure the SRS transmission, resources may be allocated to the SRS by using an existing solution, and at least a part of symbols of the first symbol to the eighth symbol in a slot may be allocated to the SRS to transmit the SRS, so that more symbols can be allocated to transmit the SRS, and the access network device can perform more accurate channel estimation based on the received SRS, thereby improving a downlink throughput.

An SRS transmission method in the embodiments of this application is described below in detail with reference to FIG. 3. A terminal device in FIG. 3 may be the terminal device A or the terminal device B in the communications system shown in FIG. 1.

Figure 3:
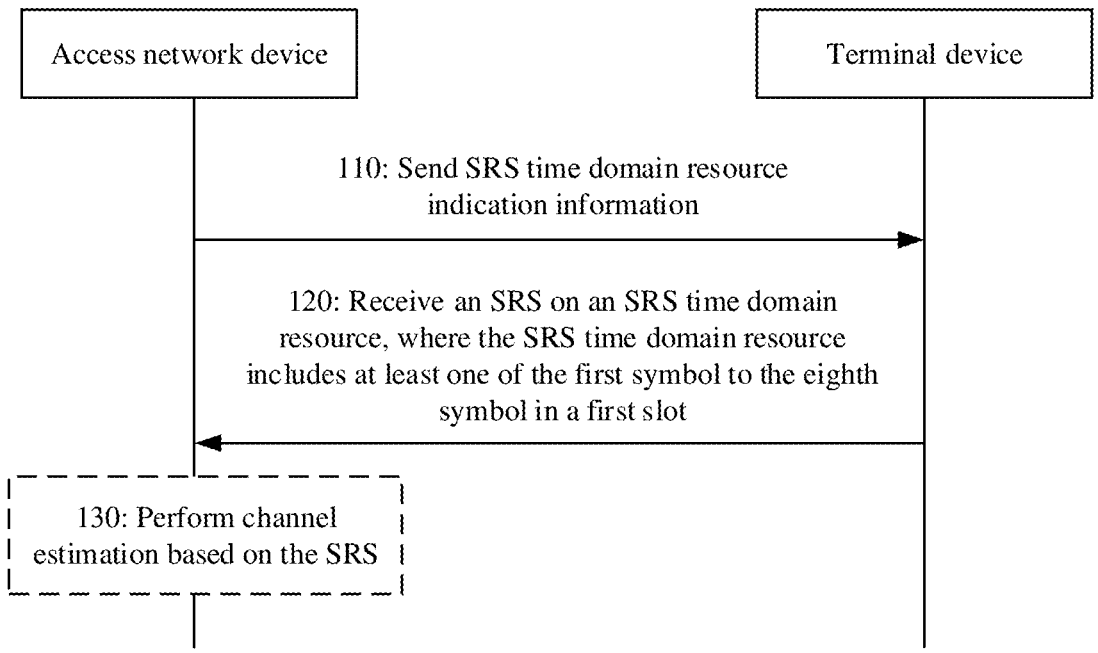
FIG. 3 is an example schematic flowchart of an SRS transmission method according to an embodiment of this application.

FIG. 3 is a schematic flowchart of an SRS transmission method according to an embodiment of this application. The method shown in FIG. 3 may include step 110 and step 120. The following describes step 110 and step 120 in detail.

110: An access network device sends SRS time domain resource indication information to the terminal device, and the terminal device receives the SRS time domain resource indication information.

The SRS time domain resource indication information in step 110 is used to indicate a location of an SRS time domain resource, and the SRS time domain resource includes at least one of the first symbol to the eighth symbol in a first slot.

The first slot may be an uplink slot, or may be a special slot. The uplink slot may be a slot including only uplink symbols, and the special slot may include flexible symbols. Optionally, the special slot may further include uplink symbols and/or downlink symbols.

Figure 4:
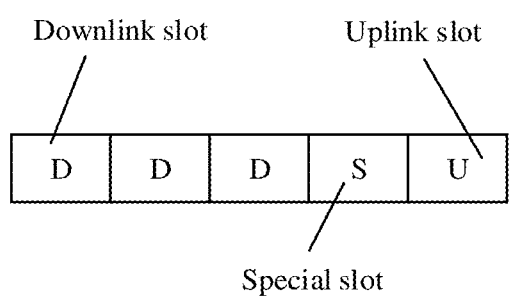
FIG. 4 is an example schematic diagram of an uplink slot, a downlink slot, and a special slot.

For example, the first slot may be an uplink slot U in FIG. 4, or may be a special slot S in FIG. 4.

Optionally, the first slot may include 14 symbols.

Optionally, all or a part of symbols in the first slot may be used to transmit an SRS.

Optionally, the SRS time domain resource may include an uplink time domain resource and/or a flexible time domain resource. Optionally, each symbol in the SRS time domain resource may be an uplink symbol or a flexible symbol. In other words, an uplink symbol or a flexible symbol may be used to transmit the SRS, and each of at least one of the first symbol to the eighth symbol in the first slot may be an uplink symbol or a flexible symbol.

Optionally, the access network device may configure a periodic SRS and an aperiodic SRS for the terminal device. The SRS time domain resource indication information may indicate a location of a time domain resource of the periodic SRS, a location of a time domain resource of the aperiodic SRS, or a location of a time domain resource of a semi-persistent SRS.

Optionally, the access network device may configure a dynamic SRS or a semi-persistent SRS for the terminal device.

Optionally, the SRS time domain resource indication information may be carried in radio resource control (RRC) signaling, downlink control information (DCI), and/or a media access control control element (MAC CE).

120: The terminal device sends the SRS to the access network device on the SRS time domain resource, and the access network device receives, on the SRS time domain resource, the SRS sent by the terminal device.

After step 110 in which the terminal device obtains the SRS time domain resource indication information, the terminal device may determine the location of the SRS time domain resource based on the SRS time domain resource indication information. Then, the terminal device may send the SRS to the access network device on the SRS time domain resource.

After receiving the SRS sent by the terminal device, the access network device may perform channel estimation based on the SRS. Therefore, the method shown in FIG. 3 may further include step 130.

130: The access network device performs the channel estimation based on the SRS.

In step 130, the access network device performs the channel estimation based on the SRS sent by the terminal device, to determine a channel status.

In this application, the SRS may be transmitted by using at least one of the first symbol to the eighth symbol in the first slot. Compared with a manner, in a related solution, in which an SRS can be transmitted by using at most four of the last six symbols in a slot, the manner in this application may allocate more symbols to transmit the SRS, so that the access network device can perform more accurate channel estimation based on the received SRS, thereby improving a downlink throughput.

Further, when all of the first symbol to the eighth symbol in the first slot are used to transmit the SRS, more time domain resources can be used to transmit the SRS, so that an SRS capacity can be increased, thereby improving accuracy of the channel estimation performed based on the SRS.

Optionally, in an implementation, the SRS time domain resource further includes M symbols of the ninth symbol to the fourteenth symbol in the first slot, and M is a positive integer.

Optionally, each of the M symbols of the ninth symbol to the fourteenth symbol in the first slot may be an uplink symbol or a flexible symbol.

A value of M may be any value of 1 to 6.

Optionally, in an embodiment, M=3, M=5, or M=6.

In this application, the SRS may be transmitted by using any quantity of symbols of the first eight symbols in the first slot and any quantity of symbols of the last six symbols in the first slot. Compared with a manner, in the related solution, in which an SRS can be transmitted by using only a fixed quantity (for example, one, two, or four) of symbols of the last six symbols in a slot, the manner in this application can more flexibly allocate symbols used to transmit the SRS, and can use more symbols to transmit the SRS, so that the access network device can perform more accurate channel estimation based on the received SRS, thereby improving the downlink throughput.

Optionally, the symbols in the SRS time domain resource are consecutive.

That the symbols in the SRS time domain resource are consecutive may mean that indexes of arrangement locations of the symbols in the SRS time domain resource differ by 1 successively.

For example, when the SRS time domain resource includes the second symbol, the third symbol, and the fourth symbol in the first slot, the symbols in the SRS time domain resource are consecutive.

Optionally, the symbols in the SRS time domain resource are inconsecutive.

That the symbols in the SRS time domain resource are inconsecutive may specifically mean that indexes of arrangement locations of the symbols in the SRS time domain resource do not differ by 1 successively.

For example, when the SRS time domain resource includes the second symbol, the third symbol, the fourth symbol, and the tenth symbol in the first slot, the symbols in the SRS time domain resource are inconsecutive (e.g., where indexes of arrangement locations of the second symbol to the fourth symbol differ by 1 successively, but indexes of arrangement locations of the fourth symbol and the tenth symbol differ by a value greater than 1, and therefore, the symbols in the SRS time domain resource are inconsecutive).

For another example, when the SRS time domain resource includes the first symbol, the third symbol, and the fifth symbol in the first slot, the symbols in the SRS time domain resource are inconsecutive (e.g., indexes of arrangement locations of the first symbol, the third symbol, and the fifth symbol differ by 2 successively, and therefore, the symbols in the SRS time domain resource are inconsecutive).

In this application, the SRS may be transmitted by using consecutive symbols, or may be transmitted by using inconsecutive symbols. Compared with a manner, in the conventional solution, in which an SRS can be transmitted by using only consecutive symbols, the manner of transmitting the SRS in this application is more flexible.

It should be understood that, in this application, the SRS time domain resource may alternatively include any quantity of symbols in the first slot or all of symbols in the first slot.

Figure 6:
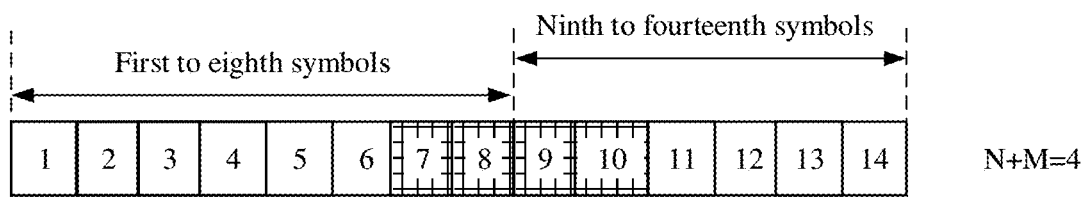
FIG. 6 is an example schematic diagram of distribution of N symbols.
Figure 6:
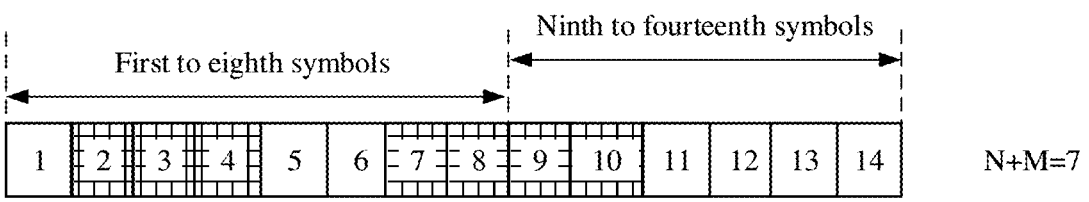
Figure 7:
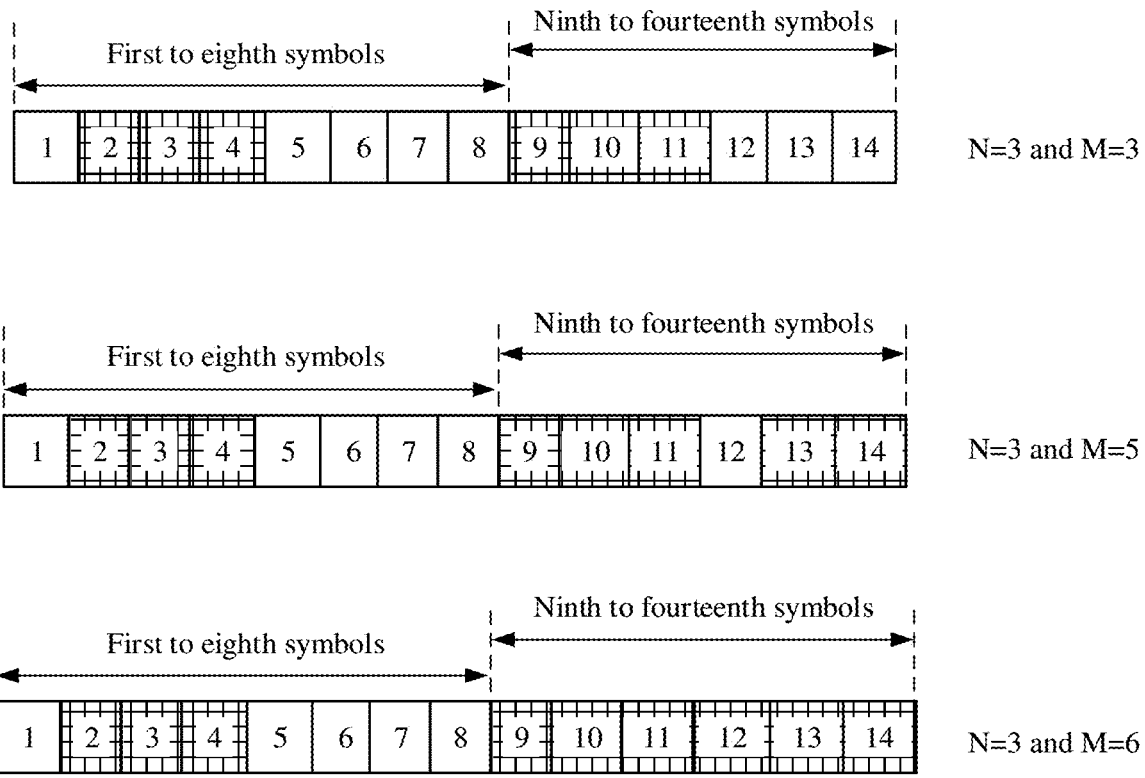
FIG. 7 is an example schematic diagram of distribution of N symbols.

With reference to the accompanying drawings, the following describes in detail a specific distribution case of symbols in the SRS time domain resource in the first slot by using a specific example. It should be understood that the following cases shown in FIG. 5 to FIG. 7 are merely a part of cases of distribution of symbols in the SRS time domain resource in the first slot, the distribution case of symbols in the SRS time domain resource in the first slot is not limited to the cases shown in FIG. 5 to FIG. 7.

First case: The SRS time domain resource includes N symbols of the first symbol to the eighth symbol in the first slot.

Figure 5:
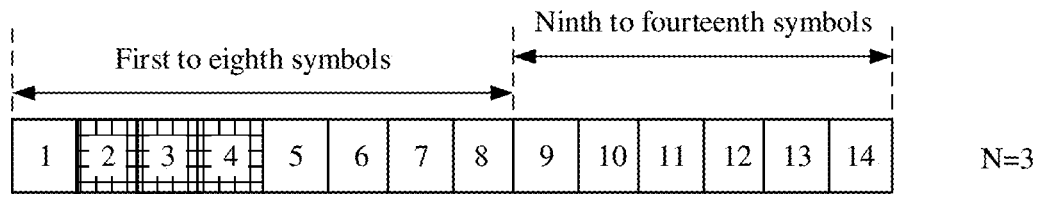
FIG. 5 is an example schematic diagram of distribution of N symbols.
Figure 5:
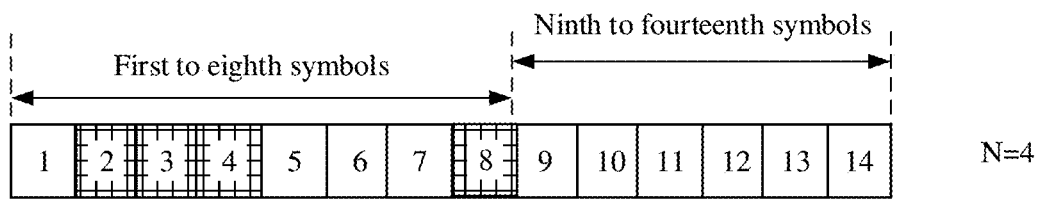

For example, as shown in FIG. 5, when N=3, the SRS time domain resource may include the second symbol, the third symbol, and the fourth symbol in the first slot. In this case, the symbols in the SRS time domain resource are consecutive.

For example, as shown in FIG. 5, when N=4, the SRS time domain resource may include the second symbol, the third symbol, the fourth symbol, and the eighth symbol in the first slot. In this case, the N symbols are inconsecutive.

It can be learned from FIG. 5 that the N symbols may be consecutive. In this case, the symbols in the SRS time domain resource are inconsecutive.

Second case: The SRS time domain resource includes N symbols of the first symbol to the eighth symbol in the first slot and M symbols of the ninth symbol to the fourteenth symbol in the first slot.

For example, as shown in FIG. 6, when N+M=4, the SRS time domain resource may include the seventh symbol, the eighth symbol, the ninth symbol, and the tenth symbol in the first slot. In this case, the symbols in the SRS time domain resource are consecutive.

For example, as shown in FIG. 6, when N+M=7, the SRS time domain resource may include the second symbol, the third symbol, the fourth symbol, the seventh symbol, the eighth symbol, the ninth symbol, and the tenth symbol in the first slot. In this case, the symbols in the SRS time domain resource are inconsecutive.

Further, in the second case, M may be 3, 5, or 6.

For example, as shown in FIG. 7, when N=3 and M=3, the SRS time domain resource may include the second symbol to the fourth symbol in the first slot and the ninth symbol to the eleventh symbol in the first slot. In this case, the symbols in the SRS time domain resource are inconsecutive.

For example, as shown in FIG. 7, when N=3 and M=5, the SRS time domain resource may include the second symbol to the fourth symbol in the first slot, the ninth symbol to the eleventh symbol, the thirteenth symbol, and the fourteenth symbol in the first slot. In this case, the symbols in the SRS time domain resource are inconsecutive.

For example, as shown in FIG. 7, when N=3 and M=6, the SRS time domain resource may include the second symbol to the fourth symbol in the first slot and the ninth symbol to the fourteenth symbol in the first slot. In this case, the symbols in the SRS time domain resource are inconsecutive.

It should be understood that the SRS time domain resource may include at least one of the first symbol to the eighth symbol in the first slot, and the SRS time domain resource may further include the ninth symbol to the fourteenth symbol in the first slot. Further, the SRS time domain resource may completely include three symbols, five symbols, or six symbols of the ninth symbol to the fourteenth symbol in the first slot. The SRS transmission method in this case is described below in detail with reference to FIG. 8.

Figure 8:
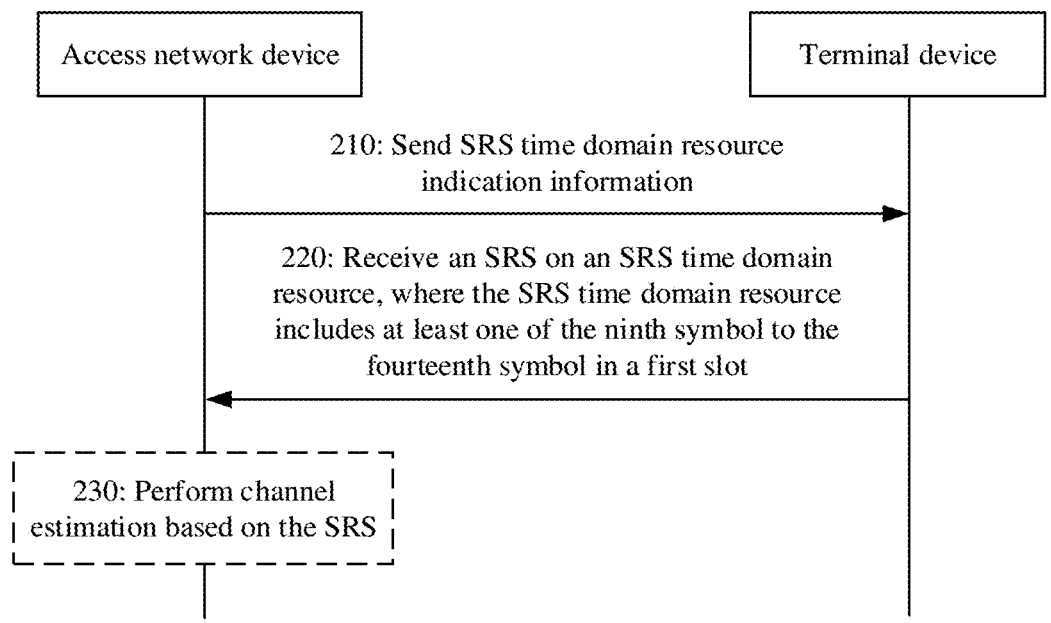
FIG. 8 is an example schematic flowchart of an SRS transmission method according to an embodiment of this application.

FIG. 8 is a schematic flowchart of an SRS transmission method according to an embodiment of this application. The method shown in FIG. 8 may include step 210 and step 220. The following describes step 210 and step 220 in detail.

210: An access network device sends SRS time domain resource indication information to a terminal device, and the terminal device receives the SRS time domain resource indication information.

The SRS time domain resource indication information in step 210 is used to indicate a location of an SRS time domain resource, and the SRS time domain resource includes at least one of the ninth symbol to the fourteenth symbol in a first slot. Further, the SRS time domain resource includes three symbols, five symbols, or six symbols of the ninth symbol to the fourteenth symbol in the first slot.

Optionally, the SRS time domain resource may include an uplink time domain resource and/or a flexible time domain resource. Optionally, each symbol in the SRS time domain resource may be an uplink symbol or a flexible symbol. In other words, an SRS may be transmitted by using an uplink symbol or a flexible symbol.

Optionally, the access network device may configure a periodic SRS, an aperiodic SRS, or a semi-persistent SRS for the terminal device. The SRS time domain resource indication information may indicate a location of a time domain resource of the periodic SRS, a location of a time domain resource of the aperiodic SRS, or a location of a time domain resource of the semi-persistent SRS.

Optionally, the SRS time domain resource indication information may be carried in RRC signaling, DCI, and/or a MAC CE.

The first slot may be an uplink slot, or may be a special slot.

Optionally, the first slot includes 14 symbols in total.

All or a part of symbols in the first slot may be used to transmit the SRS.

When all of symbols in the first slot are used to transmit the SRS, more time domain resources can be used to transmit the SRS, so that an SRS capacity can be increased, thereby improving accuracy of channel estimation performed based on the SRS.

220: The terminal device sends the SRS to the access network device on the SRS time domain resource, and the access network device receives, on the SRS time domain resource, the SRS sent by the terminal device.

After step 210 in which the terminal device obtains the SRS time domain resource indication information, the terminal device may determine the location of the SRS time domain resource based on the SRS time domain resource indication information. Then, the terminal device may send the SRS to the access network device on the SRS time domain resource.

After receiving the SRS sent by the terminal device, the access network device may perform the channel estimation based on the SRS. Therefore, the method shown in FIG. 8 may further include step 230.

230: The access network device performs the channel estimation based on the SRS.

In step 230, the access network device performs the channel estimation based on the SRS sent by the terminal device, to determine a channel status.

In this application, the access network device may receive, on three, five, or six of the last six symbols in the first slot, the SRS sent by the terminal device. Compared with a manner, in a conventional solution, in which an SRS can be transmitted by using at most four of the last six symbols in a slot (in this application, at most all of the last six symbols in a slot can be allocated to transmit the SRS, however, in the conventional solution, at most four of the last six symbols in a slot can be allocated), the manner in this application may allocate more symbols to transmit the SRS, so that the access network device can perform more accurate channel estimation based on the received SRS, thereby improving a downlink throughput.

Optionally, the symbols in the SRS time domain resource are consecutive.

Figure 9:
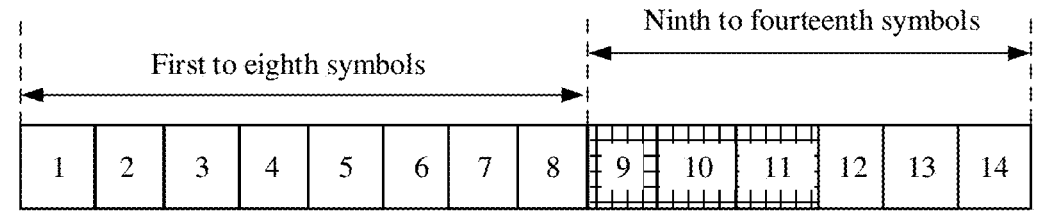
FIG. 9 is an example schematic diagram of distribution of N symbols.
Figure 9:
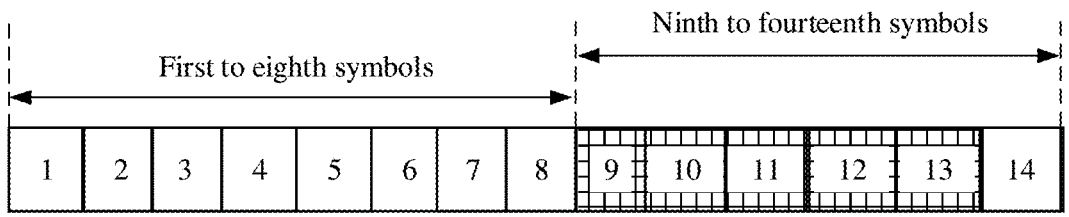
Figure 9:
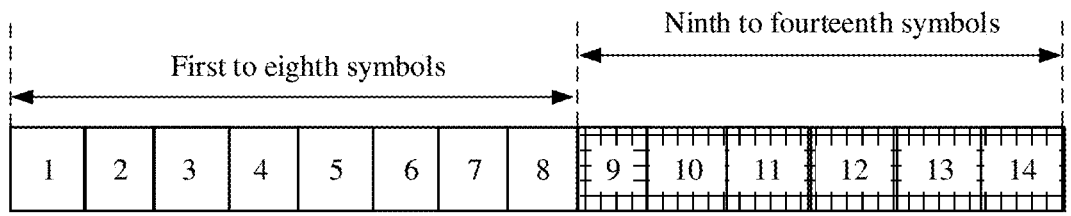

For example, as shown in FIG. 9, when the SRS time domain resource includes three symbols, the access network device may receive, on the ninth symbol to the eleventh symbol in the first slot, the SRS sent by the terminal device.

For example, as shown in FIG. 9, when the SRS time domain resource includes five symbols, the access network device may receive, on the ninth symbol to the thirteenth symbol in the first slot, the SRS sent by the terminal device.

For example, as shown in FIG. 9, when the SRS time domain resource includes six symbols, the access network device may receive, on the ninth symbol to the fourteenth symbol in the first slot, the SRS sent by the terminal device.

It can be learned from FIG. 9 that the access network device may receive, on three consecutive symbols, five consecutive symbols, or six consecutive symbols of the ninth symbol to the fourteenth symbols in the first slot, the SRS sent by the terminal device.

Optionally, when the SRS time domain resource includes three symbols or five symbols of the ninth symbol to the fourteenth symbol in the first slot, the symbols in the SRS time domain resource are inconsecutive.

Figure 10:
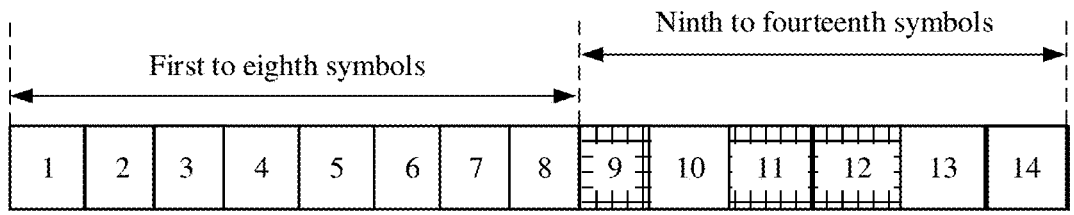
FIG. 10 is an example schematic diagram of distribution of N symbols.
Figure 10:
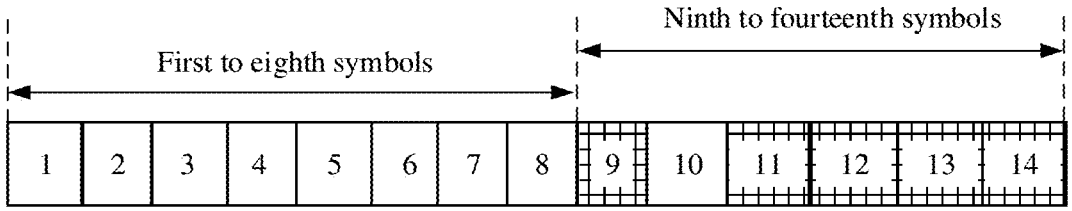

For example, as shown in FIG. 10, when the SRS time domain resource includes three symbols, the access network device may receive, on the ninth symbol, the eleventh symbol, and the twelfth symbol in the first slot, the SRS sent by the terminal device.

For example, as shown in FIG. 10, when the SRS time domain resource includes five symbols, the access network device may receive, on the ninth symbol and the eleventh symbol to the fourteenth symbol in the first slot, the SRS sent by the terminal device.

It can be learned from FIG. 10 that the access network device may receive, on three inconsecutive symbols or five inconsecutive symbols of the ninth symbol to the fourteenth symbols in the first slot, the SRS sent by the terminal device.

In this application, the SRS may be transmitted by using a plurality of consecutive symbols of the last six symbols in a slot, or may be transmitted by using a plurality of inconsecutive symbols of the last six symbols in a slot. Compared with a manner, in the conventional solution, in which an SRS can be transmitted by using only consecutive symbols, the manner of transmitting the SRS in this application is more flexible.

It should be understood that, in the method shown in FIG. 8 in this application, the SRS time domain resource indicated by the SRS time domain resource indication information includes at least one of the first symbol to the eighth symbol in the first slot. In the method shown in FIG. 8 in this application, the SRS time domain resource indicated by the SRS time domain resource indication information includes three symbols, five symbols, or six symbols of the ninth symbol to the fourteenth symbol in the first slot.

In addition, on a same carrier, both an SRS and a PUSCH occupy a time domain resource of the carrier during transmission. When more time domain resources are allocated to the SRS, PUSCH transmission may be affected. In a TDD system, an uplink slot may be used to transmit both a PUSCH and an SRS. When the SRS is transmitted by using a symbol in the uplink slot, to ensure that the PUSCH transmission is not affected, a PUSCH transmitted in a current frequency band may be scheduled to another idle frequency band for transmission.

Therefore, this application provides an SRS transmission method. When an SRS is transmitted by using a symbol in an uplink slot of a frequency band, a PUSCH originally transmitted in the uplink slot of the frequency band is scheduled to another idle frequency band different from the frequency band for transmission. In this way, when it is ensured that the transmission of the PUSCH is not affected, more time domain resources are allocated to the SRS, so that the access network device can perform more accurate channel estimation based on the received SRS.

Figure 11:
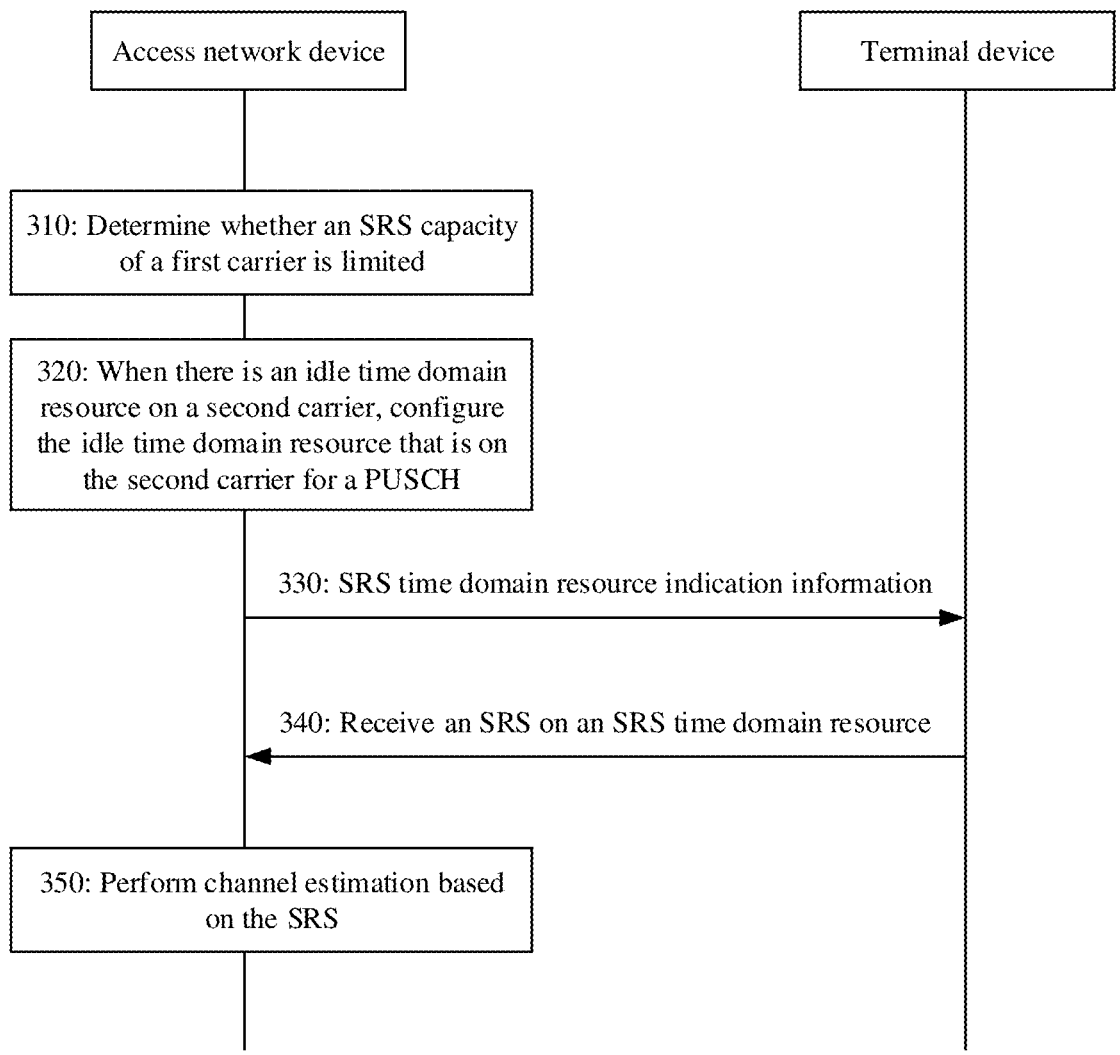
FIG. 11 is an example schematic flowchart of an SRS transmission method according to an embodiment of this application.

FIG. 11 is a schematic diagram of an SRS transmission method according to an embodiment of this application. The method shown in FIG. 11 includes step 310 to step 330. The following describes these steps in detail.

310: An access network device determines whether an SRS capacity of a first carrier is limited.

In step 310, the access network device may determine, based on a quantity of terminal devices in a coverage area of the access network device and service requirements of the terminal devices, whether the SRS capacity of the first carrier is limited.

The access network device may perform step 320 when the SRS capacity of the first carrier is limited.

320: When there is an idle time domain resource on a second carrier, configure the idle time domain resource that is on the second carrier for a PUSCH.

It should be understood that, when it is determined in step 310 that the SRS capacity of the first carrier is limited, step 320 may be performed, so that more time domain resources can be provided on the first carrier for an SRS.

Optionally, in step 320, a time domain resource of the first carrier is originally configured for the PUSCH. When the SRS capacity of the first carrier is limited, the PUSCH is configured on the idle time domain resource of the second carrier for sending, so that more time domain resources can be allocated to the SRS.

330: The access network device sends SRS time domain resource indication information to the terminal device, where the SRS time domain resource indication information is used to indicate an SRS time domain resource used by the terminal device to send the SRS.

It should be understood that the SRS time domain resource in step 330 may meet the limitation on the SRS time domain resource in the methods shown in FIG. 3 and FIG. 8. Specifically, distribution of symbols in the SRS time domain resource indicated by the SRS time domain resource indication information in step 330 may be shown in FIG. 5 to FIG. 7, FIG. 9, and FIG. 10.

340: The access network device receives, on the SRS time domain resource, the SRS sent by the terminal device.

350: The access network device performs channel estimation based on the SRS.

In one example embodiment, 310 may be optional. That is, the access network device may directly perform 320 without determining whether the SRS capacity of the first carrier is limited.

In the method shown in FIG. 11, the idle time domain resource on the second carrier is configured for the PUSCH, so that more time domain resources on the first carrier can be used to transmit the SRS, and the access network device can perform more accurate channel estimation based on the received SRS, thereby improving a downlink throughput.

In addition, when interference between neighboring cells is relatively severe, more time domain resources are allocated to the SRS, so that SRS time domain resources of the neighboring cells can be staggered, to avoid overlapping of SRS time domain resources of different cells, and reduce interference between the cells.

The SRS transmission method in the embodiments of this application is described below in detail with reference to FIG. 12.

Figure 12:
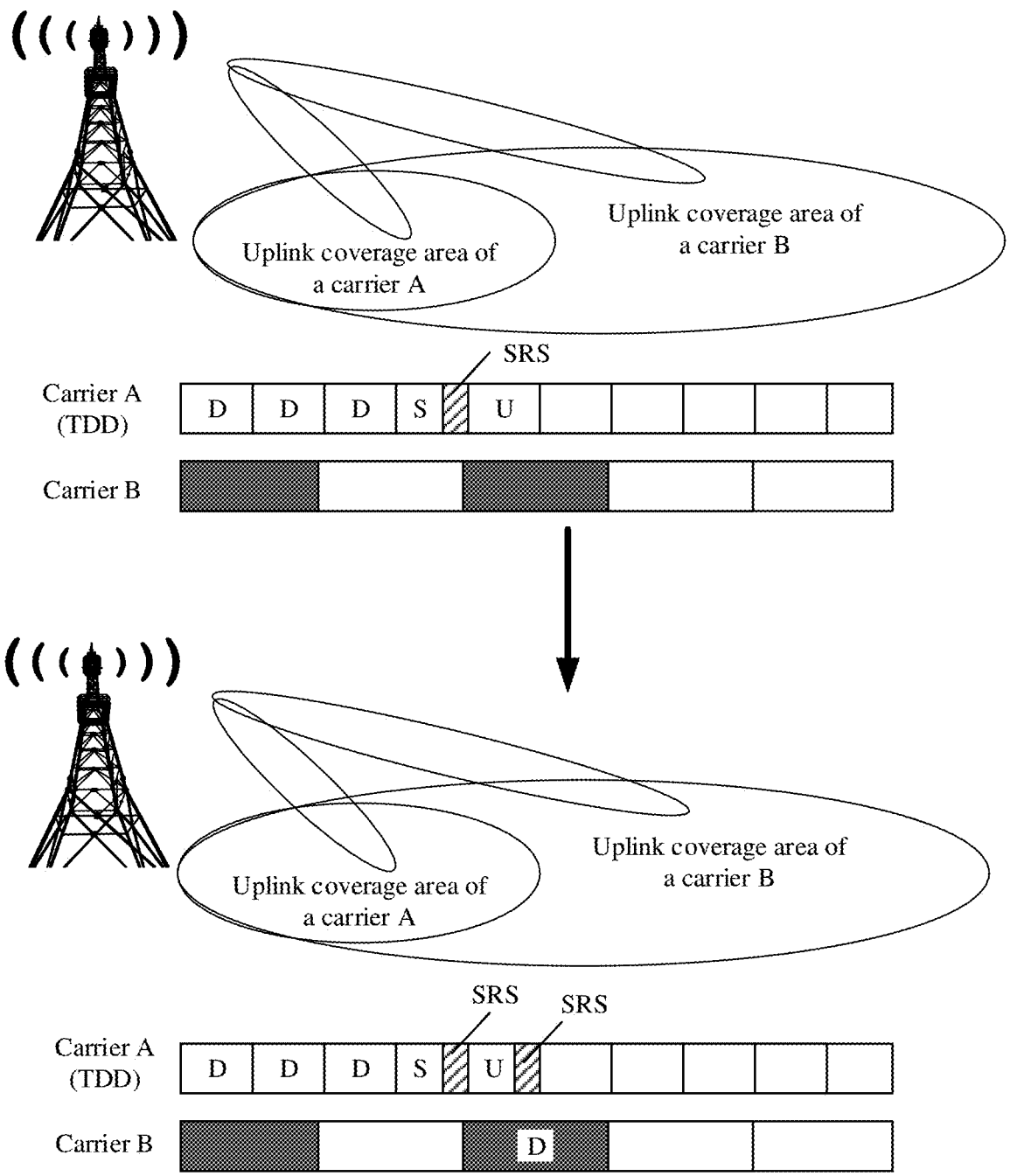
FIG. 12 is an example schematic diagram of an SRS transmission method according to an embodiment of this application.

As shown in FIG. 12, an example in which a carrier A is a normal uplink (NUL) carrier and a carrier B is a supplementary uplink (SUL) carrier is used, an access network device may communicate with a terminal device through the carrier A (the carrier A may be a carrier in a TDD network) and the carrier B (the carrier B may be a carrier in an FDD network). Coverage areas of the access network device on the carrier A and the carrier B are shown in FIG. 12. An uplink coverage area of the carrier B is larger than an uplink coverage area of the carrier A (the uplink coverage area of the carrier A is located in the uplink coverage area of the carrier B). In a conventional solution, usually, two of the last six symbols in a slot are used (at most four of the last six symbols in a slot can be used) to transmit an SRS.

As shown in a lower side of FIG. 12, to allocate more symbols to the SRS, a part or all of symbols in an original uplink slot U may be allocated to the SRS for transmitting the SRS. In other words, the SRS may occupy a part of symbols in the uplink slot (the SRS may also occupy all of symbols in the uplink slot U, and only a case in which the SRS occupies a part of symbols in the uplink slot U is shown herein) for transmission. However, a PUSCH that originally occupies an uplink slot in the carrier A may be scheduled to an idle spectrum in the carrier B (e.g., a blank part in the carrier B is the idle spectrum) for transmission.

In FIG. 12, an NUL carrier and an SUL carrier are used as an example. A person skilled in the art may understand that the carrier A may be an SUL carrier, and the carrier B may be an NUL carrier; or the carrier A and the carrier B may be two CA carriers respectively.

A person skilled in the art may understand that the carrier A or the carrier B may be the first carrier of related content in FIG. 11. For transmitting an SRS on the carrier A (or the carrier B), refer to related content in FIG. 1 to FIG. 12.

The foregoing describes in detail the SRS transmission method in the embodiments of this application with reference to FIG. 1 to FIG. 12. The following describes an access network device and a terminal device in the embodiments of this application with reference to FIG. 13 to FIG. 16. It should be understood that, the access network device and the terminal device that are described below can separately perform the steps performed by the access network device and the terminal device in the SRS transmission method in the embodiments of this application.

Figure 13:
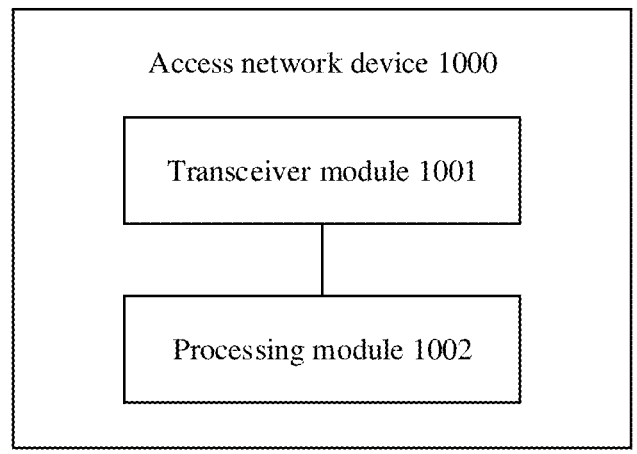
FIG. 13 is an example schematic block diagram of an access network device according to an embodiment of this application.

FIG. 13 is a schematic block diagram of an access network device according to an embodiment of this application.

The access network device 1000 shown in FIG. 13 includes a transceiver module 1001 and a processing module 1002. The access network device 1000 may be configured to perform related steps (e.g., steps performed by the access network device) in the method shown in FIG. 3, or may be configured to perform related steps (e.g., steps performed by the access network device) in the method shown in FIG. 8.

When the access network device 1000 is configured to perform related steps in the method shown in FIG. 3, specific functions of the transceiver module 1001 and the processing module 1002 are as follows.

The transceiver module 1001 is configured to send channel sounding reference signal SRS time domain resource indication information to a terminal device, where the SRS time domain resource indication information indicates an SRS time domain resource, and the SRS time domain resource includes at least one of the first symbol to the eighth symbol in a first slot.

The processing module 1002 is configured to receive an SRS from the terminal device on the SRS time domain resource.

In this application, because the SRS may also be transmitted by using at least one of the first symbol to the eighth symbol in the first slot, compared with a manner, in a conventional solution, in which an SRS can be transmitted by using at most four of the last six symbols in a slot, the manner in this application may allocate more symbols to transmit the SRS, so that the access network device can perform more accurate channel estimation based on the received SRS, thereby improving a downlink throughput.

When the access network device 1000 is configured to perform related steps in the method shown in FIG. 8, specific functions of the transceiver module 1001 and the processing module 1002 are as follows.

The transceiver module 1001 is configured to send channel sounding reference signal SRS time domain resource indication information to a terminal device, where the SRS time domain resource indication information indicates an SRS time domain resource, and the SRS time domain resource includes three symbols, five symbols, or six symbols of the ninth symbol to the fourteenth symbol in a first slot.

The processing module 1002 is configured to receive an SRS from the terminal device on the SRS time domain resource.

In this application, the access network device may receive, on three, five, or six of the last six symbols in the first slot, the SRS sent by the terminal device. Compared with a manner, in a conventional solution, in which an SRS can be transmitted by using at most four of the last six symbols in a slot (in this application, at most all of the last six symbols in a slot can be allocated to transmit the SRS, however, in the conventional solution, at most four of the last six symbols in a slot can be allocated), the manner in this application may allocate more symbols to transmit the SRS, so that the access network device can perform more accurate channel estimation based on the received SRS, thereby improving a downlink throughput.

Figure 14:
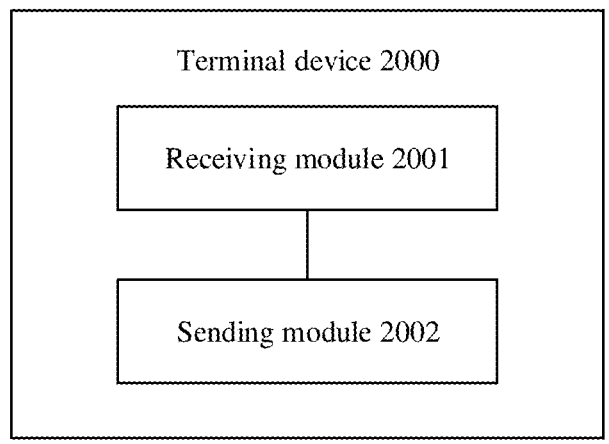
FIG. 14 is an example schematic block diagram of a terminal device according to an embodiment of this application.

FIG. 14 is a schematic block diagram of a terminal device according to an embodiment of this application.

The terminal device 2000 shown in FIG. 14 includes a receiving module 2001 and a sending module 2002. The terminal device 2000 may be configured to perform related steps (e.g., steps performed by the terminal device) in the method shown in FIG. 3, or may be configured to perform related steps (e.g., steps performed by the terminal device) in the method shown in FIG. 8.

When the terminal device 2000 is configured to perform related steps in the method shown in FIG. 3, specific functions of the receiving module 2001 and the sending module 2002 are as follows:

The receiving module 2001 is configured to receive channel sounding reference signal SRS time domain resource indication information from an access network device, where the SRS time domain resource indication information indicates an SRS time domain resource, and the SRS time domain resource includes at least one of the first symbol to the eighth symbol in a first slot.

The sending module 2002 is configured to send an SRS to the access network device on the SRS time domain resource.

In this application, because the SRS may also be transmitted by using at least one of the first symbol to the eighth symbol in the first slot, compared with a manner, in a conventional solution, in which an SRS can be transmitted by using at most four of the last six symbols in a slot, the manner in this application may allocate more symbols to transmit the SRS, so that the access network device can perform more accurate channel estimation based on the received SRS, thereby improving a downlink throughput.

When the terminal device 2000 is configured to perform related steps in the method shown in FIG. 8, specific functions of the receiving module 2001 and the sending module 2002 are as follows:

The receiving module 2001 is configured to receive channel sounding reference signal SRS time domain resource indication information from an access network device, where the SRS time domain resource indication information indicates an SRS time domain resource, and the SRS time domain resource includes three symbols, five symbols, or six symbols of the ninth symbol to the fourteenth symbol in a first slot.

The sending module 2002 is configured to send an SRS to the access network device on the SRS time domain resource.

In this application, the SRS may be transmitted by using any quantity of symbols of the first eight symbols in the first slot and any quantity of symbols of the last six symbols in the first slot. Compared with a manner, in a conventional solution, in which an SRS can be transmitted by using only one, two, or four of the last six symbols in a slot, the manner in this application can more flexibly allocate symbols used to transmit the SRS, and can use more symbols to transmit the SRS, so that the access network device can perform more accurate channel estimation based on the received SRS, thereby improving a downlink throughput.

Figure 15:
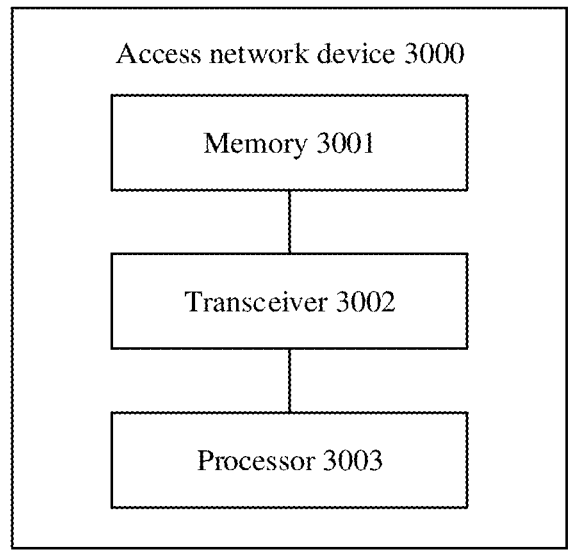
FIG. 15 is an example schematic block diagram of an access network device according to an embodiment of this application.

FIG. 15 is a schematic block diagram of an access network device according to an embodiment of this application.

The access network device 3000 in FIG. 15 includes a memory 3001, a transceiver 3002, and a processor 3003. Specific functions of the memory 3001, the transceiver 3002, and the processor 3003 are as follows:

The memory 3001 is configured to store a program.

The processor 3003 is configured to execute the program stored in the memory 3001. When the program stored in the memory 3001 is executed, the processor 3003 and the transceiver 3002 are configured to perform related steps performed by the access network device in the method shown in FIG. 3 or FIG. 8.

When the processor 3003 and the transceiver 3002 are configured to perform the method shown in FIG. 3, the processor 3003 and the transceiver 3002 are specifically configured to perform the following steps.

The transceiver 3002 is configured to send channel sounding reference signal SRS time domain resource indication information to a terminal device, where the SRS time domain resource indication information indicates an SRS time domain resource, and the SRS time domain resource includes at least one of the first symbol to the eighth symbol in a first slot.

The processor 3003 is configured to receive an SRS from the terminal device on the SRS time domain resource.

When the processor 3003 and the transceiver 3002 are configured to perform the method shown in FIG. 3, the processor 3003 and the transceiver 3002 are specifically configured to perform the following steps.

The transceiver 3002 is configured to send channel sounding reference signal SRS time domain resource indication information to a terminal device, where the SRS time domain resource indication information indicates an SRS time domain resource, and the SRS time domain resource includes three symbols, five symbols, or six symbols of the ninth symbol to the fourteenth symbol in a first slot.

The processor 3003 is configured to receive an SRS from the terminal device on the SRS time domain resource.

Figure 16:
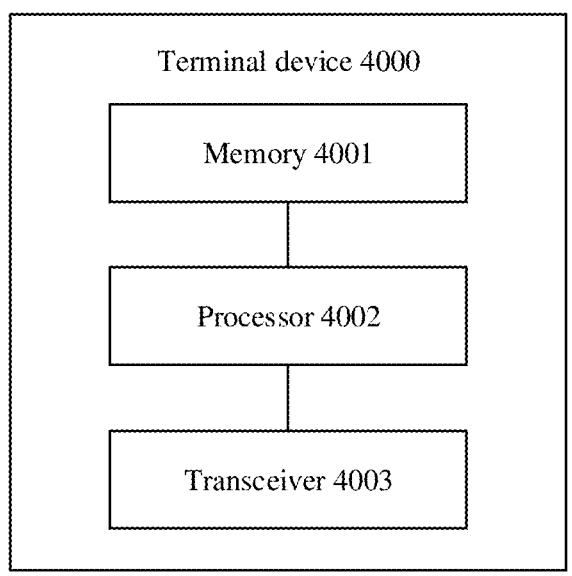
FIG. 16 is an example schematic block diagram of a terminal device according to an embodiment of this application.

FIG. 16 is a schematic block diagram of a terminal device according to an embodiment of this application.

The terminal device 4000 in FIG. 16 includes a memory 4001, a processor 4002, and a transceiver 4003. Specific functions of the memory 4001, the processor 4002, and the transceiver 4003 are as follows:

The memory 4001 is configured to store a program.

The processor 4002 is configured to execute the program stored in the memory 4001. When the program stored in the memory 4001 is executed, the transceiver 4003 is configured to perform related steps performed by the terminal device in the method shown in FIG. 3 or FIG. 8.

When the transceiver 4003 is configured to perform the method shown in FIG. 3, the transceiver 4003 is specifically configured to: receive channel sounding reference signal SRS time domain resource indication information from an access network device, where the SRS time domain resource indication information indicates an SRS time domain resource, and the SRS time domain resource includes at least one of the first symbol to the eighth symbol in a first slot; and send an SRS to the access network device on the SRS time domain resource.

When the transceiver 4003 is configured to perform the method shown in FIG. 8, the transceiver 4003 is specifically configured to: receive channel sounding reference signal SRS time domain resource indication information from an access network device, where the SRS time domain resource indication information indicates an SRS time domain resource, and the SRS time domain resource includes three symbols, five symbols, or six symbols of the ninth symbol to the fourteenth symbol in a first slot; and send an SRS to the access network device on the SRS time domain resource.

Figure 17:
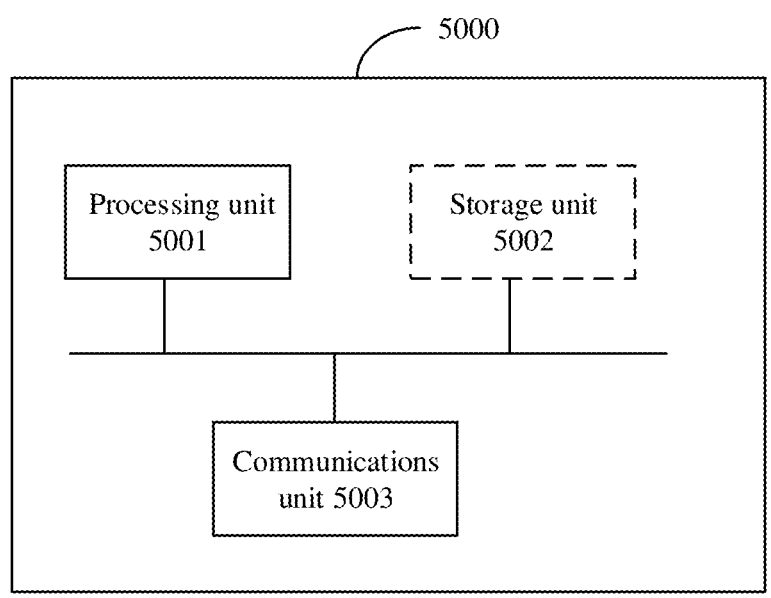
FIG. 17 is an example schematic block diagram of a communications device according to an embodiment of this application.

FIG. 17 is a schematic block diagram of a communications apparatus according to an embodiment of this application.

The communications apparatus 5000 shown in FIG. 17 may be a chip in the access network device in the embodiments of this application. A communications unit 5003 may be an input or output interface, a pin, a circuit, or the like. Optionally, a storage unit 5002 may store computer-executable instructions of a method on an access network device side, to enable a processing unit 5001 to perform the method on the access network device side in the foregoing embodiments. The storage unit 5002 may be a register, a cache, a RAM, or the like, and the storage unit 5002 may be integrated together with the processing unit 5001. The storage unit 5002 may be a ROM or another type of static storage device that can store static information and instructions, and the storage unit 5002 may be independent of the processing unit 5001. Optionally, with development of wireless communications technologies, a transceiver may be integrated into the communications apparatus 5000. For example, a transceiver and a network interface are integrated into the communications unit 5003.

Alternatively, the communications apparatus 5000 shown in FIG. 17 may be a chip in the terminal device in the embodiments of this application. A communications unit 5003 may be an input or output interface, a pin, a circuit, or the like. Optionally, a storage unit 5002 may store computer-executable instructions of a method on an access network device side, to enable the communications unit 5003 to perform the method on a terminal device side in the foregoing embodiments. The storage unit 5002 may be a register, a cache, a RAM, or the like, and the storage unit 5002 may be integrated together with the processing unit 5001. The storage unit 5002 may be a ROM or another type of static storage device that can store static information and instructions, and the storage unit 5002 may be independent of the processing unit 5001. Optionally, with development of wireless communications technologies, a transceiver may be integrated into the communications apparatus 5000. For example, a transceiver and a network interface are integrated into the communications unit 5003.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be understood by a person skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A sounding reference signal (SRS) transmission method, comprising:
   scheduling a physical uplink shared channel (PUSCH) transmission, which has occupied an uplink slot of a first carrier, to an idle time domain resource on a second carrier;
   determining whether a SRS capacity of the first carrier is limited;
   in response to determining that the SRS capacity of the first carrier is limited, scheduling the PUSCH transmission to the idle time domain resource on the second carrier;
   sending SRS time domain resource indication information to a terminal device, wherein
      the SRS time domain resource indication information indicates a SRS time domain resource, and
      the SRS time domain resource is part or all of the uplink slot on the first carrier;
   receiving, on the SRS time domain resource, a SRS from the terminal device; and
   performing channel estimation based on the SRS.

2. The method according to claim 1, wherein determining whether the SRS capacity of the first carrier is limited comprises:
   determining, based on a quantity of terminal devices in a coverage area of an access network device and service requirements of the terminal devices, whether the SRS capacity of the first carrier is limited.

3. The method according to claim 1, wherein the first carrier is a normal uplink carrier, and the second carrier is a supplementary uplink carrier; or
   the first carrier is a supplementary uplink carrier, and the second carrier is a normal uplink carrier; or
   the first carrier and the second carrier are two carriers in a carrier aggregation scenario.

4. The method according to claim 1, wherein
   the SRS time domain resource comprises at least one of a first symbol to an eighth symbol of the uplink slot.

5. The method according to claim 4, wherein the SRS time domain resource further comprises M symbols of a ninth symbol to a fourteenth symbol in the uplink slot, and M is a positive integer.

6. The method according to claim 5, wherein M=3, M=5, or M=6.

7. The method according to claim 1, wherein
   the SRS time domain resource comprises three symbols, five symbols, or six symbols of a ninth symbol to a fourteenth symbol of the uplink slot.

8. The method according to claim 7, wherein the SRS time domain resource further comprises three symbols or five symbols of the ninth symbol to the fourteenth symbol in a first slot, and the SRS time domain resource are inconsecutive symbols.

9. The method according to claim 1, wherein when interference between neighboring cells is high, more time domain resources are allocated to the SRS.

10. An apparatus for a base station, comprising:
    at least one processor; and
    a memory operatively coupled to the at least one processor and configured to store instructions which, when executed by the at least one processor, instruct the base station to:
       schedule a physical uplink shared channel (PUSCH) transmission, which has occupied an uplink slot of a first carrier, to an idle time domain resource on a second carrier;
       determine whether a SRS capacity of the first carrier is limited;
       in response to determining that the SRS capacity of the first carrier is limited, schedule the PUSCH transmission to the idle time domain resource on the second carrier;
       send sounding reference signal (SRS) time domain resource indication information to a terminal device, wherein the SRS time domain resource indication information indicates a SRS time domain resource, and
the SRS time domain resource is part or all of the uplink slot on the first carrier;
receive, on the SRS time domain resource, a SRS from the terminal device; and
perform channel estimation based on the SRS.

11. The apparatus according to claim 10, wherein determining whether the SRS capacity of the first carrier is limited comprises:
determining, based on a quantity of terminal devices in a coverage area of an access network device and service requirements of the terminal devices, whether the SRS capacity of the first carrier is limited.

12. The apparatus according to claim 10, wherein the first carrier is a normal uplink carrier, and the second carrier is a supplementary uplink carrier; or
the first carrier is a supplementary uplink carrier, and the second carrier is a normal uplink carrier; or
the first carrier and the second carrier are two carriers in a carrier aggregation scenario.

13. The apparatus according to claim 10, wherein
the SRS time domain resource comprises at least one of a first symbol to an eighth symbol of the uplink slot.

14. The apparatus according to claim 13, wherein the SRS time domain resource further comprises M symbols of a ninth symbol to a fourteenth symbol in the uplink slot, and M is a positive integer.

15. The apparatus according to claim 14, wherein M=3, M=5, or M=6.

16. The apparatus according to claim 10, wherein
the SRS time domain resource comprises three symbols, five symbols, or six symbols of a ninth symbol to a fourteenth symbol of the uplink slot.

17. The apparatus according to claim 16, wherein the SRS time domain resource further comprises three symbols or five symbols of the ninth symbol to the fourteenth symbol in a first slot, and the SRS time domain resource are inconsecutive symbols.

18. A non-transitory computer readable storage medium configured to store computer readable instructions that, when executed by a processor, cause the processor to provide execution comprising:
scheduling a physical uplink shared channel (PUSCH) transmission, which has occupied an uplink slot of a first carrier, to an idle time domain resource on a second carrier;
determining whether a SRS capacity of the first carrier is limited;
in response to determining that the SRS capacity of the first carrier is limited, scheduling the PUSCH transmission to the idle time domain resource on the second carrier;
sending SRS time domain resource indication information to a terminal device, wherein
the SRS time domain resource indication information indicates a SRS time domain resource, and
the SRS time domain resource is part or all of the uplink slot on the first carrier;
receiving, on the SRS time domain resource, a SRS from the terminal device; and
performing channel estimation based on the SRS.

19. The non-transitory computer readable storage medium of claim 18, wherein determining whether the SRS capacity of the first carrier is limited comprises:
determining, based on a quantity of terminal devices in a coverage area of an access network device and service requirements of the terminal devices, whether the SRS capacity of the first carrier is limited.

20. The non-transitory computer readable storage medium of claim 18, wherein the first carrier is a normal uplink carrier, and the second carrier is a supplementary uplink carrier; or
the first carrier is a supplementary uplink carrier, and the second carrier is a normal uplink carrier; or
the first carrier and the second carrier are two carriers in a carrier aggregation scenario.

* * * * *